May 22, 1951      J. W. BICKEL ET AL      2,553,842
REMOTE REGISTER FOR GAS METERS
Filed Dec. 14, 1945      2 Sheets-Sheet 2
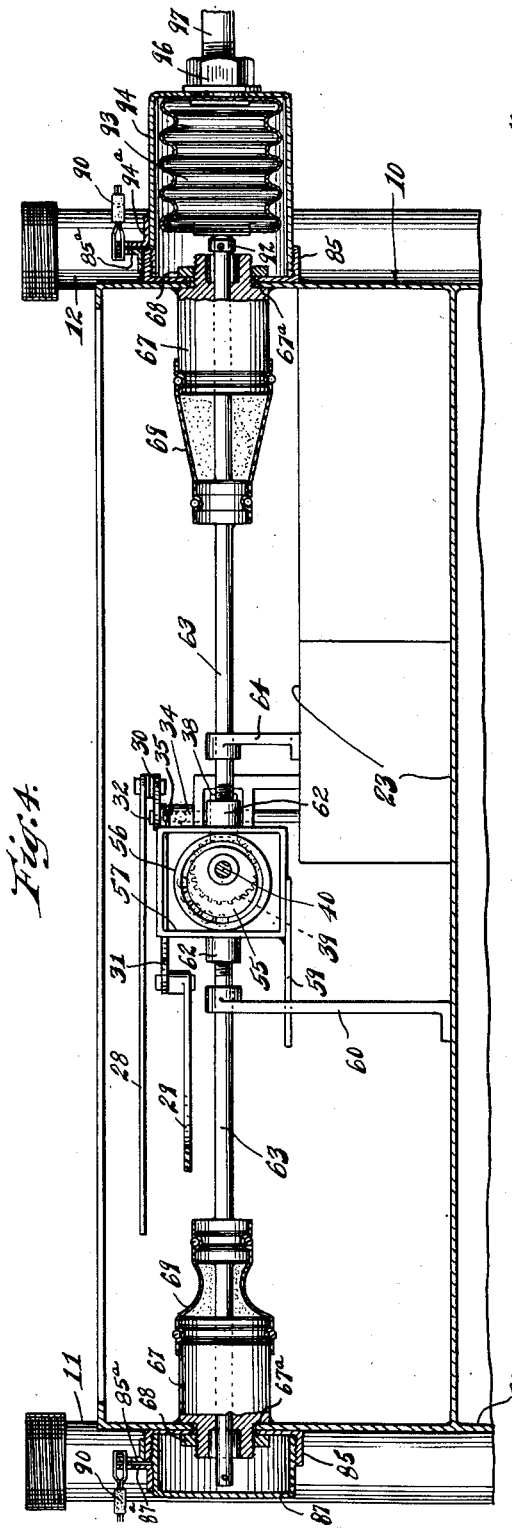
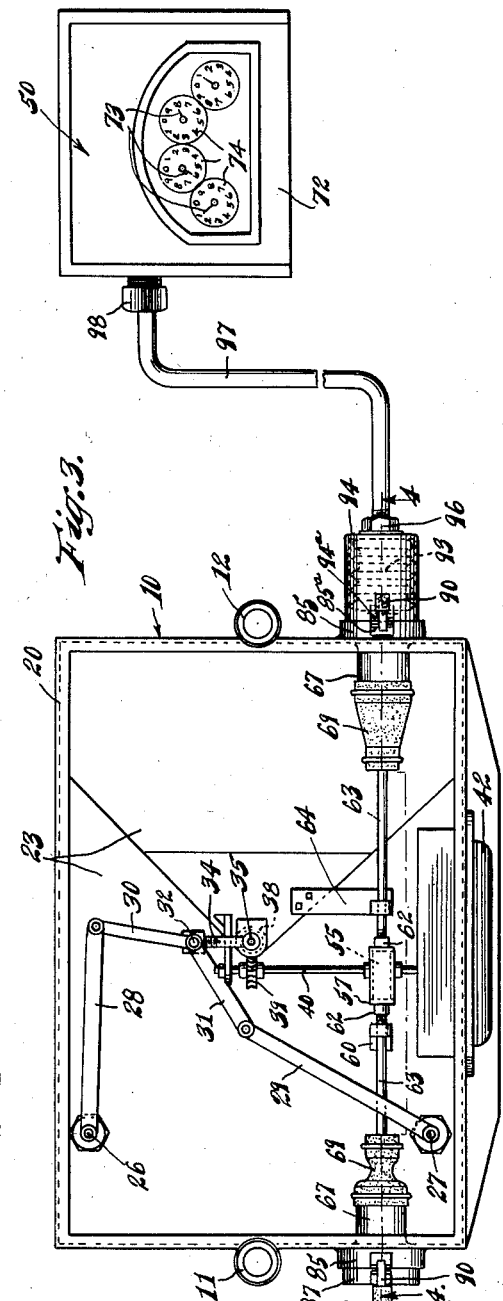
Inventors:
Joseph W. Bickel.
and John A. Reding.
By Bair & Freeman
Atty's Patented May 22, 1951

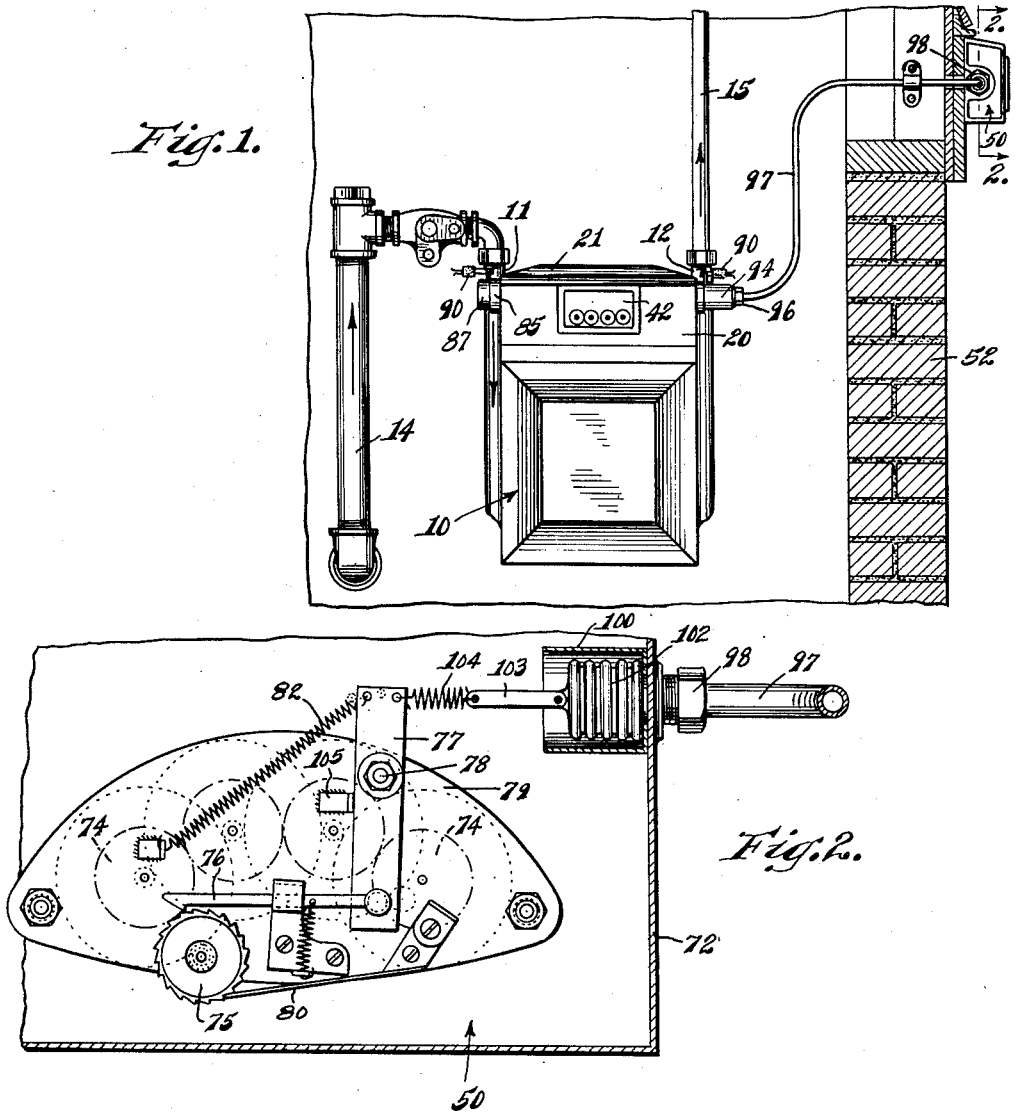

2,553,842

UNITED STATES PATENT OFFICE 2,553,842

REMOTE REGISTER FOR GAS METERS

Joseph W. Bickel, Skokie, and John A. Reding, Evanston, Ill.

Application December 14, 1945, Serial No. 635,009

4 Claims. (Cl. 235—91)

This invention relates to improvements in fluid meters and especially, though not exclusively, gas meters of the type which, due to their construction and use in certain geographical areas, render it necessary that such meters be disposed within a building. Such meters are generally constructed with an indicating register, in direct association therewith, and the total assembly is frequently referred to as a meter.

In certain localities where there is considerable variation in temperature, such as in the Midwestern States, it is necessary that gas meters be installed inside buildings, where temperatures are fairly constant, because the changing temperatures outside cause gas to expand or contract, which causes an inaccuracy in metering the gas. Also this same change in temperatures causes a condensation of water in the meters, which at low temperature, would freeze, thus rendering the meter and indicating register inoperative and interrupting gas service to customers, which could prove very serious. Hence in such localities it has been necessary to locate the meter with its indicating register within the building, thus making it necessary for the meter reader to enter the building at certain intervals of time for the purpose of recording the reading of the indicating register of the meter in order that the customer or user of the fluid may be periodically billed for the amount of fluid consumed.

The location of the meter and its indicating register within the building presents several objectionable conditions. By virtue of such installations, the meter reader must be admitted to the building every time the indicating register of the meter is to be read, which practice has long been considered as objectionable from both the customer viewpoint as well as the public utility company or other organization which supplies the fluid. To admit the meter reader to the building frequently discommodes some person in the building, and during inclement weather, the floors of the building frequently become unnecessarily soiled by the entrance of the meter reader. This type of installation also presents the further objectionable condition, namely that it frequently necessitates a meter reader making several calls to the building in order to gain access thereto, thus resulting in a substantial loss of time and causing a certain inconvenience in the accounting departments of the supplier of the fluid. Moreover, the meter reader is subjected to hazards when entering certain buildings where animals are kept.

The primary object of the present invention is to provide an improved fluid meter and indicating register construction which obviates the foregoing difficulties and objectionable conditions and by virtue of which the meter proper may be located at any convenient or desired position within the building, and an indicating register, operably connected to the meter, may be located on an exterior wall of the building, without regard to the location of the meter in the building.

Another object is to provide an improved fluid meter and indicating register construction of the above mentioned character by virtue of which the exteriorly located indicating register may be operably connected to either side of the meter casing so as to permit making of convenient installations where the meter proper must be located in an awkward or partially inaccessible location.

A further object is to provide an improved fluid meter and indicating register construction wherein a conventional meter and associated indicating register are installed within a building, and an auxiliary indicating register is mounted on the exterior wall of the building, the latter being operably connected to and driven by the mechanism of the conventional meter, and by virtue of which the auxiliary, exteriorly indicating register is operated in correspondence with the indicating register directly associated with the meter.

Still another object is to provide an improved fluid meter and indicating register construction possessing the above indicated advantages and which is durable in use, positive in operation, and capable of being economically manufactured.

Other objects and advantages of this invention will be apparent from the following description taken in connection with the accompanying drawings in which:

Figure 1 is an elevation, partly in section, showing a fluid meter and indicating register construction embodying the present invention.

Figure 2 is a vertical sectional view through the exteriorly located indicating register, taken substantially as indicated at line 2—2 on Figure 1.

Figure 3 is a top view of a conventional combination meter and register, with the top of the casing removed and embodying operating connections and remote indicating register, constituting the present invention.

Figure 4 is an enlarged, fragmentary, vertical section through the upper portion of the combination meter and indicating register, taken substantially as indicated at line 4—4 on Figure 3.

The meter and indicating register embodying the present invention, as represented in Figure 1 of the drawings, comprises a conventional meter as indicated generally at 10, provided with inlet and outlet supply conduit connections 11 and 12. The conduit connection 11 is shown connected through suitable, conventional fittings to a main supply pipe 14, and the conduit connection 12 is connected by a pipe 15, which it may be understood extends to suitable apparatus in the household or building, such as the heating plant and/or the hot water heater and/or the gas range, etc.

As may be seen in Figures 1 and 3 of the drawings, the conventional gas meter includes a sheet metal casing 20 having a removable top 21, which in use is preferably soldered to the casing. The upper portion of the casing is provided with a transverse partition wall 23 through which projects a pair of upwardly extending shafts 26 and 27, located adjacent the front and rear walls of the casing. By virtue of suitable apparatus mounted below the partition 23, and responsive to the flow of gas from the supply pipe 14 to the pipe 15, said shafts 26 and 27 are oscillated. Connected rigidly to the upper ends of the shafts 26 and 27 are arms 28 and 29 to which are pivotally connected levers 30 and 31, the free ends of which are journaled on a trunnion 32 mounted on an arm 34, the opposite end of which is mounted on a vertical shaft 35, supported by the partition wall of the casing. Thus, as the shafts 26 and 27 oscillate, the arm 34 causes rotation of the shaft 35. Mounted on the stud 35 is a worm 38, meshing with a worm gear 39, which in turn is secured to a horizontally extending shaft 40, journaled in suitable brackets which are attached to the transverse partitioning walls. The forward end of the shaft is operably connected to a conventional indicating register device, designated generally at 42, with dial reading portions visible from the external forward wall of the casing. The meter thus far described is a conventional gas meter construction which has been extensively used.

Since considerable power is developed within the meter to effect rotation of the indicating register shaft 40, we prefer to utilize such power to operate a remotely located auxiliary indicating register designated at 50, preferably mounted on the outer wall 52 of the building.

The additional apparatus required for the operation of the auxiliary indicating register 50 comprises a cam 55, rigidly mounted on the shaft 40, the cam being mounted within a roller race 56 mounted in a carrier or frame 57, of generally rectangular form, provided at its lower side with a guide finger 59, movable through an aperture formed in an upwardly extending bearing bracket 60 which is secured on the top of the partition wall 23 of the casing. Thus as the shaft 40 rotates, the cam causes the carrier 57 to be reciprocated in a horizontal direction.

Secured to opposite sides of the carrier frame 57 are bosses 62 in which are threaded a pair of oppositely extending rods 63. These rods are guided and provided with journal support in the bearing bracket 60, and in the shortened bracket indicated at 64, which is secured to the vertically offset portion of the transverse partition wall of the casing, as seen in Figure 3 of the drawings. The rods 63 extend through the opposite side walls of the casing, as clearly seen in Figure 4 of the drawings, through a pair of aligned apertures in which are mounted portions of special fittings 67, having reduced threaded portions projecting through the apertures in the side walls of the casing, and engaged by a suitable lock nut 68. A shouldered portion 67a of the respective fittings 67, abuts against the inner surfaces of the side walls of the casing and is preferably soldered thereto to provide a fluid seal. The outer ends of the rods 63 are slidably guided in these fittings 67, and to assure against possible gas leakage along the rods, flexible fluid sealing devices, indicated generally at 69, are each connected at one end, in a conventional manner, to an intermediate portion of the rods 63, and the other ends are attached to said fittings 67. Thus it will be apparent that, as the shaft 40 rotates, the rods 63 are reciprocated first in one direction and then in the opposite direction, and the interior of the casing, above partition wall 23, is sealed against fluid leakage.

The purpose of the dual arrangement of the reciprocal rods 63 is to permit making an operative connection to the outer end of either of the rods, through the side wall of the casing 20, for operating the remotely located indicating register 50. This arrangement permits making of convenient connections of the indicating register 50 and the meter proper, even when the meter is located in relatively close quarters, such as for example, with one side wall of the meter casing disposed in close proximity to another wall of the building.

The auxiliary indicating register, as represented in the drawings, is of a simple form, and includes a housing 72 in which is mounted a conventional form of mechanism for driving a plurality of indicating fingers 73 associated with a series of dials, indicated at 74, which are visible through a window in one wall of the casing 72. As shown, the mechanism includes a ratchet wheel 75, adapted to be moved in a step-by-step manner by a reciprocable ratchet dog 76, actuated by a lever 77, pivoted at 78 on a mounting frame 79 of the mechanism. It is to be understood that the ratchet wheel drives suitable gearing, indicated diagrammatically for rotating the indicating fingers 73. The ratchet wheel 75 is held against reverse rotation by a spring finger 80 attached to said mechanism frame 79. The operating lever 77 of the mechanism is yieldingly urged in a counter-clockwise direction, as seen in Figure 2 of the drawings, by a coil spring 82, when permitted by movement of operating connections to the rod 63 as will now be described. The lever 77 is operated by motion impulses transmitted from one of the reciprocable removable rods 63, within the meter casing. In the drawings we have shown fluid operated means for interconnecting the mechanism of the remotely located auxiliary indicating register 50 to the drive shaft 40, which shaft also actuates the indicating register 42 directly associated with the meter 10.

As seen in the drawings, a cup-shaped, internally threaded element 85, is mounted against each of the outer side walls of the casing, in surrounding relation to the threaded projecting ends of the fittings 67, and is preferably soldered to the wall of the casing to further insure against possible fluid leakage. The lock nuts 68 are threaded on the outer projecting portions of the fittings 67 so as to firmly clamp the bottom portion of the cup-shaped elements 85 tightly against the side walls of the casing. The exposed end of one of the rods 63 which is not to be utilized to provide a driving connection to the auxiliary indicating register 50, is preferably enclosed and sealed against unauthorized tampering. For this purpose, a cap element 87 is threaded into the cup-shaped element 85, and both the cup-shaped element and cap element are provided with apertured clips 85a and 87a, adapted to be aligned with each other and through which is adapted to be inserted a conventional form of lead-wire seal, indicated generally at 90, the purpose of which is to readily indicate possible tampering with the meter.

The other rod 63 thus provides the operating connection for actuating the auxiliary indicating register 50 and for this purpose, the outer end of said rod 63 has fixedly mounted thereon an abutment head 92, positioned to abut against the free end of an expansible-contractible bellows 93, the opposite end of which is fixedly secured in a cup-shaped housing 94. Said housing 94 is threaded into the cup-shaped element 85, and is provided with an apertured angle clip 94a adapted to be aligned with the clip 85a, for accommodating a conventional lead-wire seal 96, for the purpose above indicated. Operably connected to the housing 94 and said bellows 93 by means of nut 96, is a conduit 97 which is in open communication with the interior of the bellows 93. The conduit 97 is adapted to be extended through the wall 52 of the building in which the meter 10 is mounted, and operably connected to the auxiliary indicating register 50, mounted on the outer wall of the building. The opposite end of the conduit 97 is attached by means of a nut 98 to the fitting of a cup-shaped mounting 100, carried within the casing 72 of the auxiliary indicating register, with said end of the conduit 97 in open communication with the interior of a bellows 102, mounted within said cup-shaped mounting 100. The opposite or free end of the bellows 102 is connected by a link 103, to a spring 104 which in turn is connected to the actuating lever 77 of the mechanism of the auxiliary indicating register 50.

It is to be understood that the two bellows 93 and 102 and the conduit 97 preferably, though not necessarily so, are filled with a suitable antifreeze liquid. It will now be apparent that when the shaft 40 rotates, through the medium of the cam 55 and carrier 57 the right hand rod 63 as seen in Figures 3 and 4 will be reciprocated, thus imparting impulses to the free end of the bellows 93. Outward movement of the right hand rod 63 imparts an impulse to the bellows 93 to compress the liquid therein and the force of which is transmitted through the conduit 97 into the bellows 102 for causing an expansion of said bellows 102, thus permitting the spring 82 to operate lever 77, and cause a single step movement of the ratchet wheel 75. Upon return movement of said rod 63, the bellows 93, is permitted to expand, thereby relieving the pressure in the bellows 102 so that said bellows contracts, and through the medium of the link 103 and spring 104, actuates the lever 77 to reposition it against a stop 105, and the ratchet arm 76 in a position for engagement with the next tooth of the ratchet wheel 75, as seen in Figure 2. Thus for each revolution of the shaft 40, one impulse of the movement is transmitted to the mechanism of the auxiliary indicating register, and which it may be understood, results in operating the indicating fingers associated with the dials of the register 50, in a manner corresponding exactly to the movement of the indicating fingers of the dials of the standard indicating register, 42, directly associated with the meter 10.

Although we have herein shown and described a preferred embodiment of our invention, manifestly it is capable of modification and rearrangement of parts without departing from the spirit and scope thereof. We do not, therefore, wish to be understood as limiting this invention to the precise form herein disclosed, except as we may be so limited by the appended claims.

We claim as our invention:

1. For use with a primary indicating gas meter register which is actuated by a rotating shaft and is enclosed in a casing installed within a building, the combination comprising, a pair of oppositely extending elements mounted in the casing and having their outer ends projecting through openings in opposite walls of the casing, means on the shaft and operably connected to said elements for reciprocating the latter, fluid seal means for said openings, said fluid seal means comprising a stationary member secured to said casing through which the end of said actuating member extends and a flexible member sealed to said actuating member, said actuating member also extending through the flexible member, an auxiliary register adapted to be mounted on the exterior wall of the building in which the meter is to be installed, and fluid operated means adapted to be extended through the wall of the building for operably connecting said auxiliary register with the outer end of either of said reciprocably movable elements for operating the auxiliary register said fluid operated means including a first and a second bellows and a connecting conduit, said first bellows being mounted on said meter casing so as to be readily detachable therefrom.

2. For use with a primary indicating gas meter register which is actuated by a rotating shaft and is enclosed in a casing installed within a building, the combination comprising a pair of oppositely extending elements mounted in the casing and having their outer ends projecting through openings in opposite walls of the casing, means on the shaft and operably connected to said elements for reciprocating the latter, fluid seal means for said openings, said fluid seal means comprising a stationary member secured to said casing through which the end of said actuating member extends and a flexible member sealed to said actuating member, said actuating member also extending through the flexible member, an auxiliary register adapted to be mounted on the exterior wall of the building in which the meter is to be installed, fluid operated means comprising a conduit adapted to be extended through the wall of the building, a bellows operably connected to the outer end of one of said reciprocably movable elements and having its interior operably connected to one end of the conduit, said bellows being detachably mounted on said meter casing, and a second bellows operably connected to said auxiliary register and having its interior operably connected to the other end of said conduit, whereby the auxiliary register is caused to be actuated.

3. For use with a primary indicating gas meter register which is actuated by a rotating shaft and is enclosed in a casing installed within a building, the combination comprising, cam means mounted on said shaft, an actuating element mounted in the casing and having a cam follower coacting with said cam means, said actuating element projecting through an opening in the casing and being reciprocated by said cam means, fluid seal means for the opening in the casing, said fluid seal means comprising a stationary member secured to said casing through which the end of said actuating member extends and a flexible member sealed to said stationary member and to a portion of said actuating member, said actuating member also extending through the flexible member, an auxiliary register adapted to be mounted on the exterior of the building, and means detachably secured to said casing and extending through the wall of the building for operably connecting said auxiliary register with said actuating element, said end of said actuating member being adapted to engage and move a portion of said last means to actuate said auxiliary register.

4. For use with a primary indicating gas meter register which is actuated by a rotating shaft and is enclosed in a casing installed within a building, the combination comprising, cam means mounted on said shaft, an actuating element mounted in the casing and having a cam follower coacting with said cam means, said actuating element projecting through an opening in the casing and being reciprocated by said cam means, fluid seal means for the opening in the casing, said fluid seal means comprising a stationary member secured to said casing through which the end of said actuating member extends and a flexible member sealed to said stationary member and to a portion of said actuating member, said actuating member also extending through the flexible member, an auxiliary register adapted to be mounted on the exterior of the building, and fluid operated means extending through the wall of the building, said fluid operated means comprising a first and second bellows and a conduit in communication with both of said bellows, said bellows being detachably mounted on said casing and having operable connection with the projecting end of said actuated element, and said second bellows being operably connected with said auxiliary register.

JOSEPH W. BICKEL.
JOHN A. REDING.

REFERENCES CITED

The following references are of record in the file of this patent:

UNITED STATES PATENTS

| Number | Name | Date |
|---|---|---|
| 179,200 | Kettell | June 27, 1876 |
| 509,799 | Erhardt | Nov. 28, 1893 |
| 519,972 | Schneider | May 15, 1894 |
| 658,643 | Henning | Sept. 25, 1900 |
| 751,007 | Pratt et al. | Feb. 2, 1904 |
| 2,094,711 | Leininger | Oct. 5, 1937 |
| 2,123,577 | Pelich | July 12, 1938 |
| 2,137,524 | Bugg | Nov. 22, 1938 |
| 2,315,709 | Hudson | Apr. 6, 1943 |

FOREIGN PATENTS

| Number | Country | Date |
|---|---|---|
| 63,609 | Switzerland | Nov. 4, 1912 |